United States Patent
Liu et al.

(10) Patent No.: US 8,582,528 B2
(45) Date of Patent: Nov. 12, 2013

(54) APPARATUS FOR MANAGING MEDIA INDEPENDENT HANDOVER AND METHOD USING THE SAME

(75) Inventors: Xiaoyu Liu, Yongn-si (KR); Su Won Lee, Seongnam-si (KR); Jeong Jae Won, Hwaseong-si (KR); Eui Seok Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 11/882,909

(22) Filed: Aug. 7, 2007

(65) Prior Publication Data

US 2008/0095117 A1  Apr. 24, 2008

Related U.S. Application Data

(60) Provisional application No. 60/853,429, filed on Oct. 23, 2006.

(30) Foreign Application Priority Data

Jan. 29, 2007 (KR) .......................... 10-2007-0008832

(51) Int. Cl.
*H04W 4/00* (2009.01)
(52) U.S. Cl.
USPC .......................................................... 370/331
(58) Field of Classification Search
None
See application file for complete search history.

(56) References Cited

U.S. PATENT DOCUMENTS

| | | | |
|---|---|---|---|
| 2005/0286610 A1* | 12/2005 | Dowla et al. | 375/130 |
| 2006/0099948 A1 | 5/2006 | Hoghooghi et al. | |
| 2006/0140150 A1 | 6/2006 | Olivera-Hernandez et al. | |
| 2006/0187882 A1 | 8/2006 | Kwak et al. | |
| 2006/0229075 A1* | 10/2006 | Kim et al. | 455/436 |
| 2006/0230151 A1* | 10/2006 | Kim et al. | 709/226 |
| 2006/0265474 A1* | 11/2006 | Kim et al. | 709/218 |
| 2006/0274699 A1 | 12/2006 | Faccin | |
| 2007/0183365 A1* | 8/2007 | Ohba et al. | 370/331 |

FOREIGN PATENT DOCUMENTS

| | | |
|---|---|---|
| KR | 10-2006-0092942 A | 8/2006 |
| KR | 1020060109300 A | 10/2006 |
| WO | WO 2006/110016 A2 | 10/2006 |

OTHER PUBLICATIONS

Y. Ohba, Q. Xie, S. Das, R. Kim, S. Sreemanthula, K. Koora, V. Gupta and M. Williams, MIH Session Identifier, Feb. 27, 2006, pp. 1-6.*
S. Sreemanthula, Discussion Form on IEEE 802.21 Ad Hoc Telecon for Dec. 12, pp. 1-41, Dec. 12-30, 2005.*
S. Sreemanthula, S. Faccin, E. Hepworth, G. Daley, Problem Statement and Requirements for Event and Command Services in Media Independent Handovers, IETF Draft, Mar. 6, 2006, pp. 1-31.*
E. Hepworth, S. Sreemanthula, S. Faccin, Y. Ohba, Media Independent Handovers: Problem Statement, IETF Draft, pp. 1-20, Jul. 26, 2006.*
S. Sreemanthula, S. Faccin, IEEE 802.21 Media Independent Handover, IEEE WG Doc No. 21-05-0366-01-0000, pp. 1-11, Sep. 2005.*

(Continued)

Primary Examiner — John Blanton
Assistant Examiner — Christopher Crutchfield
(74) Attorney, Agent, or Firm — NSIP Law

(57) ABSTRACT

A method and apparatus for managing a Media Independent Handover (MIH) service is provided. The MIH service management method includes setting state information of a Media Independent Handover Function (MIHF), and managing MIH services based on the set state information of the MIHF.

13 Claims, 4 Drawing Sheets

(56) References Cited

OTHER PUBLICATIONS

S. Sreemanthula, Higher Layer Requirements for Event and Command Services, Mar. 10, 2006, pp. 1-7.*

Author unknown, The IEEE P802.21/D00.05 Draft, IEEE 802.21 Working Group, Jan. 2006, pp. 1-158.*

D. Harel, Statecharts: A Visual Formalism for Complex Systems, Science of Computer Programming, 1987, pp. 231-274.*

R. Kim, E. Njedjou, MIH Protocol Section Update, Apr. 30, 2006, pp. 1-5.*

IEEE 802.21 Presentation Release Statements; pp. 1-19.

Updates To Section 6; IEEE 802.21 Media Independent Handover; pp. 1-24.

Extended European Search Report issued Sep. 30, 2011, in counterpart European Application No. 07793369.5 (5 pages).

Liu, Xiaoyu, et al., "MIH Protocol States", IEEE 802.21 Media Independent Handover, Nov. 1, 2006, XP55007629 (7 pages).

Korean Office Action issued Jun. 25, 2013 in counterpart Korean application KR 10-2007-0008832. (5 pages, in Korean).

* cited by examiner

APPARATUS FOR MANAGING MEDIA INDEPENDENT HANDOVER AND METHOD USING THE SAME

CROSS-REFERENCE TO RELATED APPLICATION

This application claims the benefit under 35 U.S.C. §119 (e) of U.S. Provisional Application No. 60/853,429, filed on Oct. 23, 2006, in the U.S. Patent and Trademark Office, and under 35 U.S.C. §119(a) of a Korean Patent Application No. 10-2007-0008832, filed on Jan. 29, 2007, in the Korean Intellectual Property Office, the entire disclosures of both are hereby incorporated by reference.

BACKGROUND OF THE INVENTION

1. Field of the Invention

The present invention relates to a Media Independent Handover (MIH). More particularly, the present invention relates to an apparatus for managing an MIH service which can manage an MIH service based on state information of an MIH set in a functional level, and a method of using the apparatus thereof.

2. Description of Related Art

An Institute of Electrical and Electronics Engineers (IEEE) 802.21 standard is progressing international standardization of Media Independent Handover (MIH) for the purpose of providing service continuity and seamless handover between heterogeneous networks, and thereby providing user convenience with a mobile terminal.

The IEEE 802.21 standard defines a Media Independent Handover Function (MIHF), and the MIHF provides an MIH event service, an MIH command service, and an MIH information service.

An MIH protocol specifies only a message format which is exchanged between peer MIH entities and does not specify any state machine or protocol model for the state information. Specifically, the MIHF may appear stateless.

Since the MIHF is stateless, an MIH user in an upper layer of the MIHF performs MIH services, such as a command service, an event service, and an information service, irrespective of the state of a peer MIHF.

Since MIHF services are performed irrespective of the state of the peer MIHF, the MIH user may not effectively perform the MIH services.

Specifically, since the MIH services are performed irrespective of the state of the peer MIHF, an unnecessary transaction may occur in association with an MIH service to be performed and thereby the mobile terminal may unnecessarily consume power.

For example, when the MIH user is in a state that is incapable of performing a remote command service to an MINF of a network corresponding to the peer MIHF, and in this state the MIH user performs the remote command service, the MIHF of the mobile terminal transmits a transaction to the MIHF of the network until the transaction to the remote command service is performed. Specifically, the transaction is transmitted until the remote command service to the peer MIHF is performed, and thus an unnecessary transaction and unnecessary power consumption occurs.

Also, since the MIHF is stateless, a problem may occur in interoperability between an MIH protocol of the mobile terminal and an MIH protocol of a network.

Accordingly, there is a need for an improved apparatus capable of setting a state of an MIHF and managing MIH services based on the set state of the MIHF.

SUMMARY OF THE INVENTION

Exemplary embodiments of the present invention address at least the above problems and/or disadvantages and provide at least the advantages described below. Accordingly, an aspect of exemplary embodiments of the present invention is to set a state of a Media Independent Handover Function (MIHF) for interoperability between MIH protocols.

Another aspect of exemplary embodiments of the present invention is to manage MIH services based on set state information of an MIHF.

Another aspect of exemplary embodiments of the present invention is to manage MIH services based on set state information of an MIHF and thereby reduce an unnecessary transaction occurrence and unnecessary power consumption.

According to an aspect of exemplary embodiments of the present invention, there is provided a method of managing an MIH service, the method including setting state information of an MIHF, and managing MIH services based on the set state information of the MIHF.

In another aspect of exemplary embodiments of the present invention, the setting may include setting the state information of the MIHF to a first state when the MIHF is either initialized or reset, setting the state information of the MIHF to a second state when a peer MIHF is discovered in the first state, and setting the state information of the MIHF to a third state when the MIHF is registered to the peer MIHF in the second state.

In another aspect of exemplary embodiments of the present invention, the setting may include setting the state information of the MIHF to the first state when the peer MIHF is terminated in any one of the second state and the third state.

In another aspect of exemplary embodiments of the present invention, the setting may include setting the state information of the MIHF to the second state when the registration is deregistered from the MIHF in the third state.

In another aspect of exemplary embodiments of the present invention, the managing may include managing the MIH services so that an MIH user performs only a local MIH service when the state information of the MIHF is set to the first state.

In another aspect of exemplary embodiments of the present invention, the managing may include managing the MIHF services so that an MIH user does not perform a remote command service when the state information of the MIHF is set to the second state.

In another aspect of exemplary aspects of the present invention, the managing may include managing the MIHF services so that an MIH user performs a command service, an event service, and an information service when the state information of the MIHF is set to the third state.

In an aspect of exemplary embodiments of the present invention, the method may further include receiving state information of a peer MIHF, wherein the managing may include managing the MIH services based on the set state information of the MIHF and the received state information of the peer MIHF.

In another aspect of exemplary embodiments of the present invention, the MIHF includes at least one instance, and each of the at least one instance includes a plurality of sessions.

In another aspect of exemplary embodiments of the present invention, each of the plurality of sessions may include particular operations to be performed between a mobile terminal and a network.

According to another aspect of exemplary embodiments of the present invention, there is provided an apparatus for managing an MIH service, the apparatus including a state information setting unit for setting state information of an MIHF, and a service management unit for managing MIH services based on the set state information of the MIHF.

In an aspect of exemplary embodiments of the present invention, the apparatus may further include a state information receiver for receiving state information of a peer MIHF, wherein the service management unit may manage the MIH services based on the set state information of the MIHF and the received state information of the peer MIHF.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
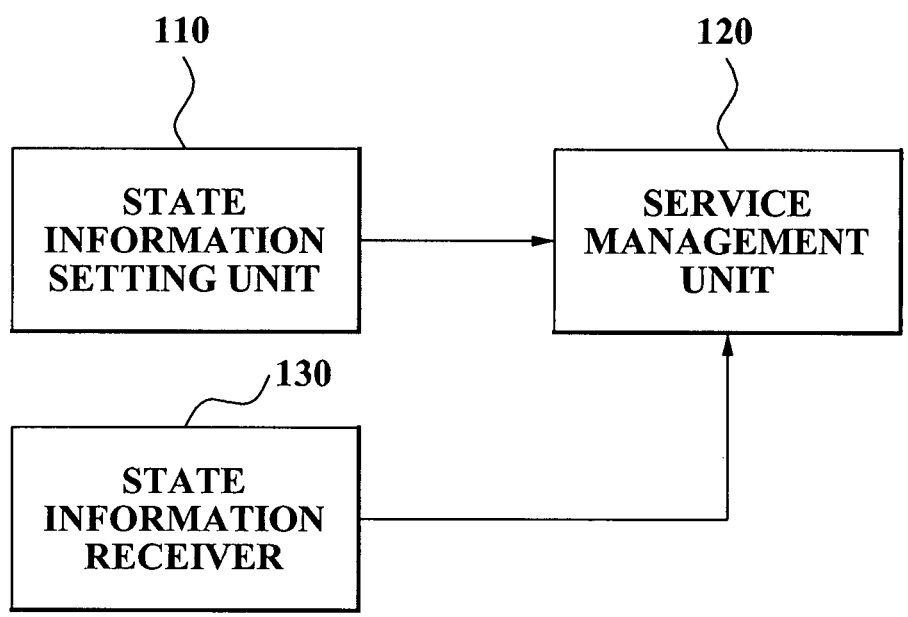
FIG. 1 is a block diagram illustrating an apparatus for managing an MIH service according to an exemplary embodiment of the present invention.

FIG. 1 is a block diagram illustrating an apparatus for managing a Media Independent Handover (MIH) service according to an exemplary embodiment of the present invention.

Referring to FIG. 1, the MIH service management apparatus includes a state information setting unit 110, a service management unit 120, and a state information receiver 130.

The state information setting unit 110 sets state information of a Media Independent Handover Function (MIHF).

The state information of the MIHF may include any one of an MIH-UNDISCOVERED state, an MIH-UNREGISTERED state, and an MIH-REGISTERED state.

Specifically, the state information setting unit 110 may set the state information of the MIHF to any one of the MIH-UNDISCOVERED state, the MIH-UNREGISTERED state, and the MIH-REGISTERED state.

However, herein, the state information of the MIHF is not limited to the MIH-UNDISCOVERED state, the MIH-UNREGISTERED state, and the MIH-REGISTERED state In an exemplary embodiment of the present invention, when the MIHF is either initialized or reset, the state information setting unit 110 may set the state information of the MIHF to the MIH-UNDISCOVERED state.

Also, when a peer MIHF is discovered in the MIH-UNDISCOVERED state, the sate information setting unit 110 may set the state information of the MIHF to the MIH-UNREGISTERED state.

Specifically, when an MIHF of a network including a mobile terminal is discovered, the mobile terminal sets state information of the MIHF to the MIH-UNREGISTERED state. In this instance, the network is set to the MIH-UNDISCOVERED state until the MIHF of the mobile terminal is changed to the MIH-REGISTERED state.

Also, when the MIHF of the mobile terminal is registered to the peer MIHF in the MIH-UNREGISTERED state, the state information setting unit 110 may set the state information of the MIHF to the MIH-REGISTERED state.

Specifically, both the mobile terminal and the network are set to the MIH-REGISTERED state.

In an exemplary embodiment of the present invention, when the peer MIHF is terminated in any one of the MIH-UNREGISTERED state and the MIH-REGISTERED state, the state information setting unit 110 may set the state information of the MIHF to the MIH-UNDISCOVERED state.

Also, when the registration is deregistered from the peer MIHF in the MIH-REGISTERED state, the state information setting unit 110 may set the state information of the MIHF to the MIH-UNREGISTERED state.

The state information receiver 130 receives the state information of the peer MIHF.

Specifically, in the case of a mobile terminal, the state information receiver 130 receives MIHF network state information from a network including the mobile terminal.

The service management unit 120 manages MIH services based on the state information of the MIHF set by the state information setting unit 110, and the state information of the peer MIHF received by the state information receiver 130.

In an exemplary embodiment of the present invention, the MIH services may include a command service, an event service, and an information service. Specifically, the service management unit 120 manages the command service, the event service, and the information service based on the set state information of the MIHF and the state information of the peer MIHF.

However, herein, the MIH services are not limited to the command service, the event service, and the information service.

In an exemplary embodiment of the present invention, when the state information of the MIHF is set to the MIH-UNDISCOVERED state by the state information setting unit 110, the service management unit 120 may manage the MIH services so that an MIH user corresponding to an upper layer of the MIHF performs only a local MIH service.

Specifically, when the state information of the MIHF is set to the MIH-UNDISCOVERED state by the state information setting unit 110, the service management unit 120 manages the MIH services so that the MIH user may not perform a remote service such as a remote command service, a remote event service, and a remote information service.

Also, when the state information of the MIHF is set to the MIH-UNREGISTERED state by the state information setting unit 110, the service management unit 120 may manage the MIH services so that the MIH user may not perform a remote command service.

Also, when the state information is set to the MIH-REGISTERED state by the state information setting unit 110, the service management unit 120 may manage the MIH services so that the MIH user may perform a command service, an event service, and an information service.

An operation of an MIH service management apparatus according to an exemplary embodiment of the present invention will be described with reference to FIGS. 2 and 3.

Figure 2:
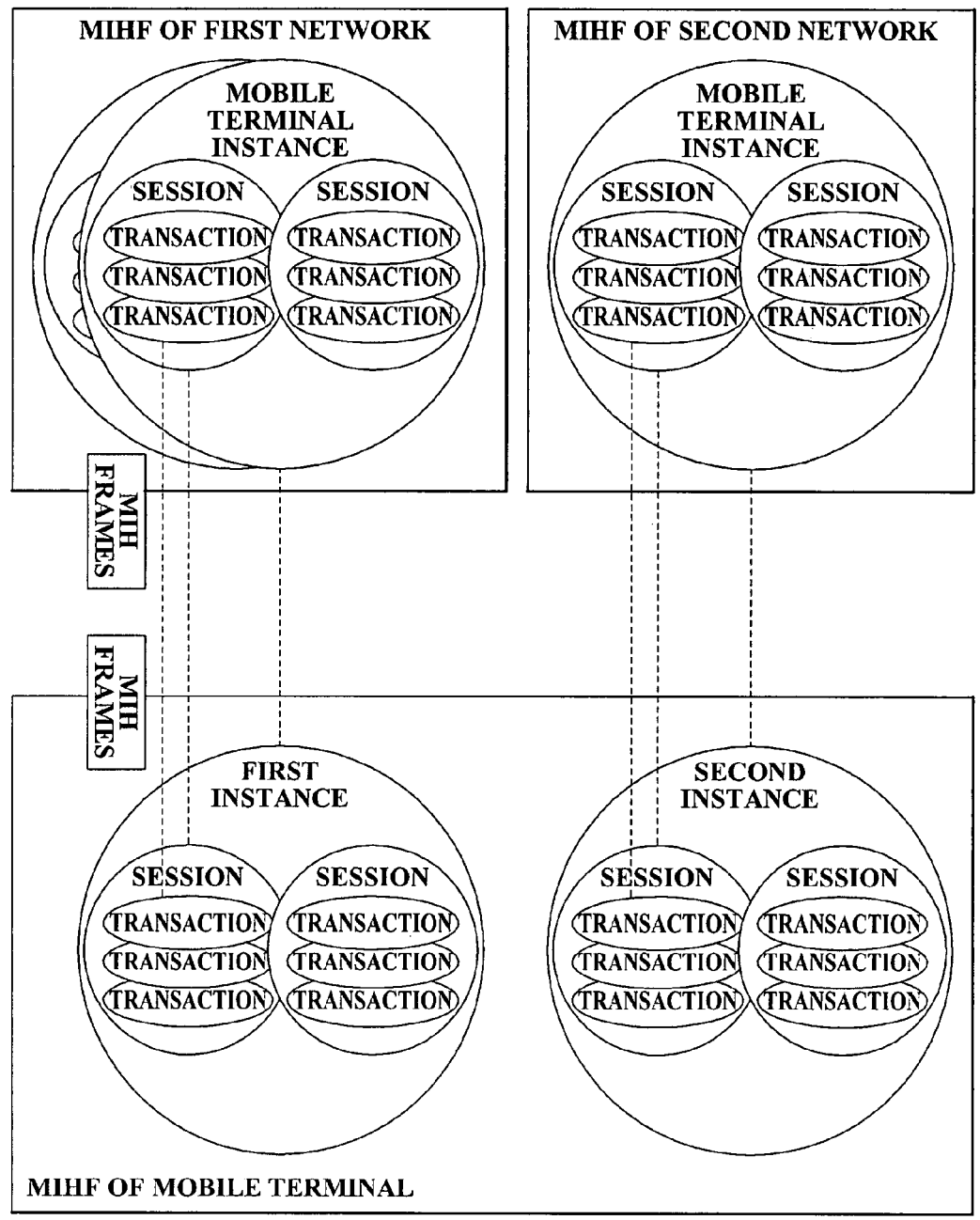
FIG. 2 illustrates a system diagram describing an apparatus for managing an MIH service according to an exemplary embodiment of the present invention.

FIG. 2 illustrates a system diagram describing an apparatus for managing an MIH service according to an exemplary embodiment of the present invention.

In an exemplary embodiment of the present invention, a mobile terminal may connect with a first network and a second network.

Specifically, an MIHF of the mobile terminal includes two state machines, for example, a first instance and a second instance.

The first instance connects with a mobile terminal instance included in an MIHF of the first network and thereby performs a communication in a functional level between the MIHF of the mobile terminal and the MIHF of the first network. Also, the second instance connects with a mobile terminal instance included in an MIHF of the second network and thereby performs a communication in a functional level between the MIHF of the mobile terminal and the MIHF of the second network.

In this instance, the functional level corresponds to a level in which an operation is performed to provide a communicable environment by using an MIHF between two communication entities. The functional level includes an MIHF node discovery procedure, a capability discovery procedure, and a registration procedure.

Also, a transaction level corresponds to a level in which an operation is performed to utilize various types of services provided in an MIHF between two communication entities. The transaction level may be performed after the communicable environment is provided in the functional level.

As shown in FIG. 2, each of the MIHFs includes a plurality of instances. Also, each of the instances includes a plurality of sessions, and each of the sessions includes a plurality of transactions.

In an exemplary embodiment of the present invention, each of the sessions may correspond to any one of the MIH services.

Also, each of the transactions may correspond to any one of the exchanged MIHF messages.

Figure 3:
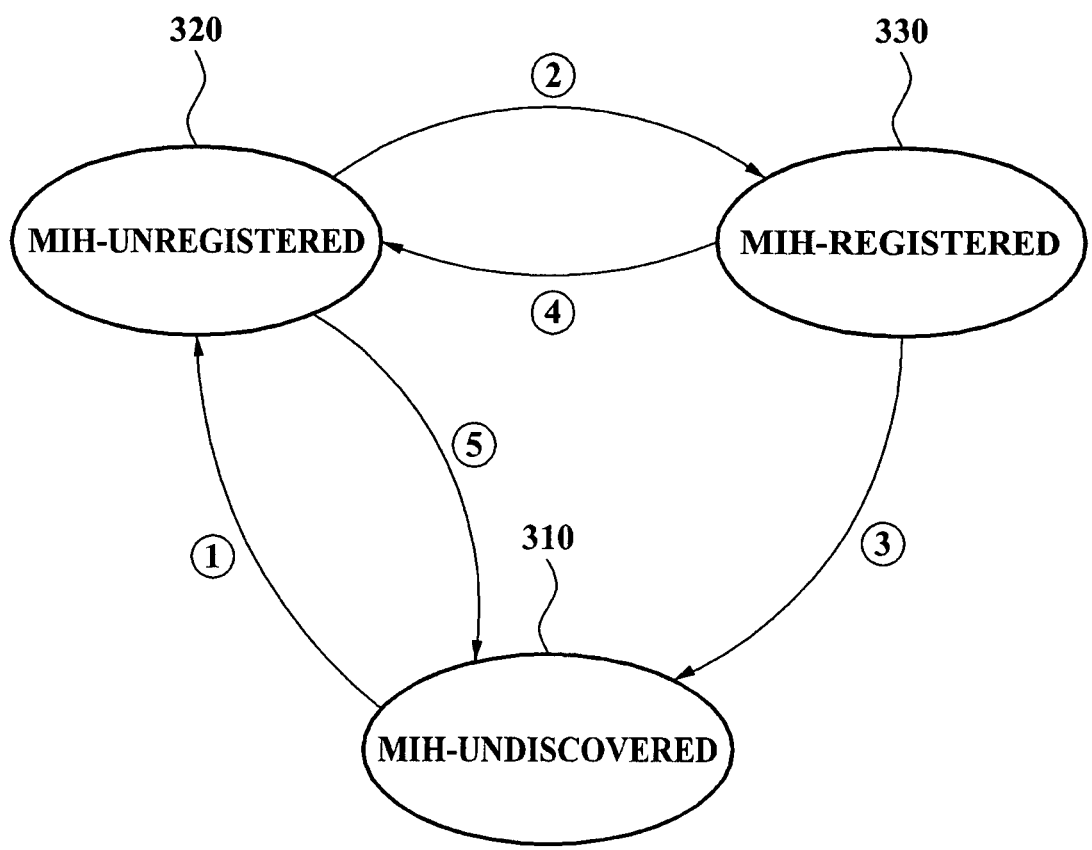
FIG. 3 illustrates an example of a transaction of MIHF state information in an apparatus for managing an MIH service according to an exemplary embodiment of the present invention.

FIG. 3 illustrates an example of a transaction of MIHF state information in an apparatus for managing an MIH service according to an exemplary embodiment of the present invention.

Hereinafter, an MIH service management apparatus with respect to an operation for an MIHF of a mobile terminal according to the present exemplary embodiment will be described with reference to FIG. 3.

In this instance, it is assumed that the mobile terminal is located in a first network area.

When the mobile terminal is located in the first network area in this instance, the mobile terminal is either initialized or reset. The state information setting unit 110 of FIG. 1 sets MIHF state information of a first instance to an MIH-UNDISCOVERED state 310.

Also, when the mobile terminal is located in a second network area in this instance, the mobile terminal is either initialized or reset. The state information setting unit 110 sets MIHF state information of a second instance to the MIH-UNDISCOVERED state 310.

The mobile terminal may perform only a local MIH service in the MIH-UNDISCOVERED state 310. Specifically, the service management unit 120 of FIG. 1 manages MIH services so that an MIH user may perform only the local MIH service.

Also, when MIHF state information of the first instance is set to the MIH-UNDISCOVERED state 310 in this instance, the mobile terminal discovers an MIHF of the first network corresponding to a peer MIHF. The state information setting unit 110 transits the MIHF state information of the first instance from the MIH-UNDISCOVERED state 310 to an MIH-UNREGISTERED state 320 as shown in ①.

The mobile terminal may not perform a remote command service in the MIH-UNREGISTERED state 320.

Also, the mobile terminal may determine which MIH services to perform with the MIHF of the first network based on the MIHF state information of the first network received by the state information receiver 130.

When the MIHF state information of the first instance is set to the MIH-UNREGISTERED state 320 in this instance, the MIHF of the first network is terminated. The state information setting unit 110 transits the MIHF state information of the first instance from the MIH-UNREGISTERED state 320 to the MIH-UNDISCOVERED state 310 as shown in ⑤.

Also, when the MIHF state information of the first instance is set to the MIH-UNREGISTERED 320 in this instance, the MIHF of the mobile terminal is registered to the MIHF of the first network. The state information setting unit 110 transits the MIHF state information of the first instance from the MIH-UNREGISTERED state 320 to an MIH-REGISTERED state 330 as shown in ②.

Also, when the MIHF state information of the first instance is transited from the MIH-UNREGISTERED state 320 to the MIH-REGISTERED state 330, it is possible to perform communication with respect to MIH services between the first instance and the mobile terminal instance of the first network, such as a command service, an event service, and an information service. In this instance, the MIHF state information of the first network should be in a state capable of performing the communication with the first stance with respect to the command service, the event service, and the information service.

Also, when the MIHF state information of the first instance is set to the MIH-REGISTERED state 330 in this instance, the MIHF of the mobile terminal, registered to the MIHF of the first network, is deregistered. The state information setting unit 110 transits the MIHF state information of the first instance from the MIH-REGISTERED state 330 to the MIH-UNREGISTERED state 320 as shown in ④.

Also, when the MIHF state information of the first instance is set to the MIH-REGISTERED state 330 in this instance, the MIHF of the first network is terminated. The state information setting unit 110 transits the MIHF state information of the first instance from the MIH-REGISTERED state 330 to the MIH-UNDISCOVERED state 310 as shown in ③.

As described above, the MIH service management apparatus according to the present exemplary embodiment manages the MIH services based on the MIHF state information set in the functional level. Accordingly, it is possible to reduce an unnecessary transaction and also to reduce unnecessary power consumption.

Figure 4:
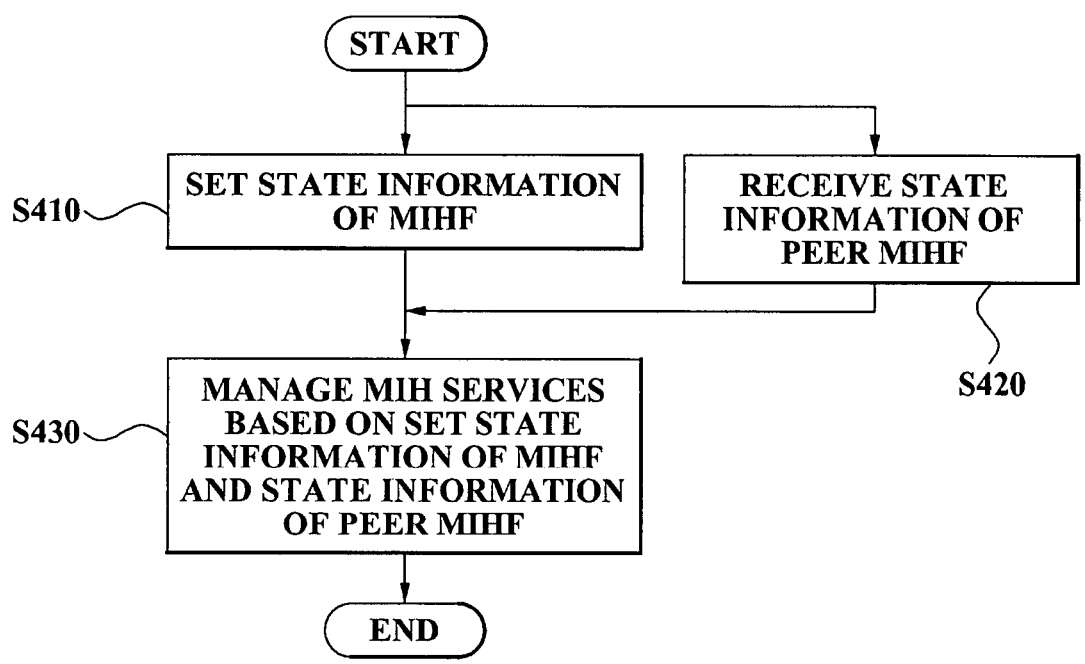
FIG. 4 illustrates a flowchart illustrating a method of managing an MIH service according to an exemplary embodiment of the present invention.

FIG. 4 illustrates a flowchart illustrating a method of managing an MIH service according to an exemplary embodiment of the present invention.

Referring to FIG. 4, in step S410, state information of an MIHF is set.

In an exemplary embodiment of the present invention, entities of setting the state information of the MIHF may include a mobile terminal and a network which can connect with the mobile terminal. In the present exemplary embodiment, only the mobile terminal will be described.

The state information of the MIHF may include any one of an MIH-UNDISCOVERED state, an MIH-UNREGISTERED state, and an MIH-REGISTERED state.

Specifically, the mobile terminal may set the state information of the MIHF to any one of the MIH-UNDISCOVERED state, the MIH-UNREGISTERED state, and the MIH-REGISTERED state.

In an exemplary embodiment of the present invention, when the MIHF is either initialized or reset, the mobile terminal may set the state information of the MIHF to the MIH-UNDISCOVERED state.

Also, when a peer MIHF, for example, an MIHF of a network including the mobile terminal, is discovered in the MIH-UNDISCOVERED state, the mobile terminal may set the state information of the MIHF to the MIH-UNREGISTERED state.

Also, when the MIHF of the mobile terminal is registered to the peer MIHF in the MIH-UNREGISTERED state, the mobile terminal may set the state information of the MIHF to the MIH-REGISTERED state.

Also, when the peer MIHF, that is, the MIHF of the network including the mobile terminal, is terminated in any one of the MIH-UNREGISTERED state and the MIH-REGISTERED state, the mobile terminal may set the state information of the MIHF to the MIH-UNDISCOVERED state.

Also, when the MIHF of the mobile terminal registered to the MIHF of the network is deregistered from the peer MIHF in the MIH-REGISTERED state, the mobile terminal may set the state information of the MIHF to the MIH-UNREGISTERED state.

In step S420, state information of the peer MIHF is received while the MIHF state information of the mobile terminal is being set. Specifically, the mobile terminal receives the MIHF state information of the network in which the mobile terminal is located.

For example, when the MIHF state information of the mobile terminal is set to any one of the MIH-UNDISCOVERED state and the MIH-UNREGISTERED state, MIHF state information of the network in the MIH-UNDISCOVERED is received.

Specifically, the mobile terminal receives information about whether a network provides an MIHF. The information is broadcasted from the network. Also, the mobile terminal receives MIHF state information of the network set to the MIH-UNDISCOVERED state from the MIHF of the network in the MIH-UNREGISTERED state. In the MIH-UNREGISTERED state, the mobile terminal can perform a capability discovery operation for confirming a providing capability with respect to the MIHF of the network.

In this instance, a method of receiving, by the mobile terminal, information about whether to provide the MIHF from the network may be different according to a transmission scheme in the network.

In step S430, when the MIHF state information of the network is received, the mobile terminal manages MIH services based on the set MIHF state information and the received MIHF state information of the network.

In an exemplary embodiment of the present invention, the MIH services may include a command service, an event service, and an information service. Specifically, the mobile terminal manages the command service, the event service and the information service based on the set state information of the MIHF and the MIHF state information of the network.

When the MIHF state information of the mobile terminal is set to the MIH-UNDISCOVERED state, the mobile terminal may manage the MIH services so that an MIH user may perform only a local MIH service.

Specifically, in this case, the MIH user may not perform a remote service, such as a remote command service, a remote event service, and a remote information service.

Also, when the state information of the mobile terminal is set to the MIH-UNREGISTERED state, the mobile terminal may manage MIH services so that the MIH user may not perform the remote command service.

Also, when the state information of the mobile terminal is set to the MIH-REGISTERED state, the mobile terminal may manage the MIH services so that the MIH user may perform the command service, the event service, and the information service locally or remotely.

The MIH service management method according to the above-described example may be recorded in computer-readable storage media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described examples.

According to exemplary embodiments of the present invention, it is possible to set a state of a Media Independent Handover Function (MIHF) for interoperability between MIH protocols.

Also, according to exemplary embodiments of the present invention, it is possible to manage MIH services based on set state information of an MIHF.

Also, according to exemplary embodiments of the present invention, it is possible to manage MIH services based on set state information of an MIHF and thereby reduce an unnecessary transaction occurrence and unnecessary power consumption.

While the invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of an apparatus for managing a Media Independent Handover (MIH) service, the method comprising:

setting state information of a Media Independent Handover Function (MIHF), based on the state of the MIHF, to one of a first state, a second state, and a third state;

configuring at least one instance in the MIHF to comprise sessions, wherein each session is configured to comprise operations to be performed between a mobile terminal and a network; and managing MIH services based on the set state information of the MIHF, wherein the managing comprises conserving power by
preventing an MIH user corresponding to an upper layer of the MIHF from attempting to remotely perform MIH command services while the MIHF is in the first state, preventing the MIH user from attempting to remotely perform the MIH command services and allowing tile MIH user to attempt to remotely perform an MIH information service and an MIH event service while the MIHF is in the second state, and allowing the MIH user to attempt to remotely perform the MIH command services while the MIHF is in the third state.

2. The method of claim 1, wherein the setting comprises:
setting the state information of the MIHF to the first state if the MIHF is either initialized or reset, setting the state information of the MIHF to the second state if a peer MIHF is discovered in the first state, and setting the state information of the MIHF to the third state if the MIHF is registered to the peer MIHF in the second state.

3. The method of claim 2, wherein the setting comprises:
setting the state information of the MIHF to the first state if the peer MIHF is terminated in any one of the second state and the third state.

4. The method of claim 2, wherein the setting comprises:
setting the state information of the MIHF from the third state to the second state if the registration is deregistered from the peer MIHF.

5. The method of claim 2, wherein the managing comprises:
managing the MIH services so that the MIH user performs only a local MIH service, if the state information of the MIHF is set to the first state.

6. The method of claim 2, wherein the managing comprises:
managing the MIH services so that the MIH user performs a command service, an event service, and an information service, if the state information of the MIHF is set to the third state.

7. A non-transitory computer-readable recording medium having stored thereon instructions for causing a processor to implement a method for managing a Media Independent Handover (MIH) service, the method comprising:
setting state information of a Media Independent Handover Function (MIHF), based on the state of the MIHF, to one of a first state, a second state, and a third state;

configuring at least one instance in the MIHF to comprise sessions, wherein each session is configured to comprise operations to be performed between a mobile terminal and a network; and managing MIH services based on the set state information of the MIHF, wherein the managing comprises conserving power by
preventing an MIH user corresponding to an upper layer of the MIHF from attempting to remotely perform MIH command services while the MIHF is in the first state, preventing the MIH user from attempting to remotely perform the MIH command services and allowing the MIH user to attempt to remotely perform an MIH information service and an MIH event service while the MIHF is in the second state, and allowing the MIH user to attempt to remotely perform the MIH command services while the MIHF is in the third state.

8. An apparatus for managing a Media Independent Handover (MIH) service, the apparatus comprising:
a state information setting unit configured to set state information of a Media Independent Handover Function (MIHF), based on the state of the MIHF, to one of a first state, a second state, and a third state, wherein the MIHF comprises at least one instance, wherein each of the at least one instance comprises sessions, and each of the sessions comprises operations to be performed between a mobile terminal and a network;

a service management unit configured to manage MIH services based on the set state information of the MIHF; and a memory configured to store the set state information of the MIHF, wherein the service management unit conserves power by
preventing an MIH user corresponding to an upper layer of the MIHF from attempting to remotely perform MIH command services while the MIHF is in the first state, preventing the MIH user from attempting to remotely perform the MIH command services and allowing the MIH user to attempt to remotely perform an MIH information service and an MIH event service while the MIHF is in the second state, and allowing the MIH user to attempt to remotely perform the MIH command services while the MIHF is in the third state.

9. The apparatus of claim 8, wherein the state information setting unit sets the state information of the MIHF to the first state if the MIHF is either initialized or reset, sets the state information of the MIHF to the second state if a peer MIHF is discovered in the first state, and sets the state information of the MIHF to the third state if the MIHF is registered to the peer MIHF in the second state.

10. The apparatus of claim 9, wherein the state information setting unit sets the state information of the MIHF to the first state if the peer MIHF is terminated in any one of the second state and the third state.

11. The apparatus of claim 9, wherein the state information setting unit sets the state information of the MIHF from the third state to the second state if the registration is deregistered from the MIHF.

12. The apparatus of claim 9, wherein the service management unit manages the MIH services so that the MIH user performs only a local MIH service when the state information of the MIHF is set to the first state.

13. The apparatus of claim 9, wherein the service management unit manages the MIH services so that the MIH user performs a command service, an event service, and an information service when the state information of the MIHF is set to the third state.

* * * * *